(12) United States Patent
Pu et al.

(10) Patent No.: US 10,608,317 B2
(45) Date of Patent: Mar. 31, 2020

(54) COMMUNICATION SYSTEM AND COMMUNICATION METHOD

(71) Applicant: HTC Corporation, Taoyuan (TW)

(72) Inventors: Ta-Chun Pu, Taoyuan (TW);
Chieh-Sen Lee, Taoyuan (TW);
Chien-Ting Ho, Taoyuan (TW);
Yen-Liang Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 266 days.

(21) Appl. No.: 15/919,232

(22) Filed: Mar. 13, 2018

(65) Prior Publication Data
US 2018/0261905 A1    Sep. 13, 2018

Related U.S. Application Data

(60) Provisional application No. 62/470,368, filed on Mar. 13, 2017.

(51) Int. Cl.
*H01Q 1/12*    (2006.01)
*G02B 27/01*    (2006.01)
(Continued)

(52) U.S. Cl.
CPC ......... *H01Q 1/1257* (2013.01); *G02B 27/017* (2013.01); *G02B 27/0176* (2013.01);
(Continued)

(58) Field of Classification Search
USPC ................................................. 342/165–174
See application file for complete search history.

(56) References Cited

U.S. PATENT DOCUMENTS

| 2,942,257 A | * | 6/1960 | Huntington | ........... | G01S 7/4004 |
| | | | | | 342/165 |
| 3,845,389 A | * | 10/1974 | Phillips | ................... | A42B 3/30 |
| | | | | | 455/90.3 |

(Continued)

FOREIGN PATENT DOCUMENTS

| CN | 103325234 A | 9/2013 |
| CN | 105242666 A | 1/2016 |

(Continued)

OTHER PUBLICATIONS

Corresponding Chinese office action dated Jun. 21, 2019.

*Primary Examiner* — Bernarr E Gregory
(74) *Attorney, Agent, or Firm* — CKC & Partners Co., LLC (57) ABSTRACT

A communication system, which is applied to a space, includes a first transceiver and a communication device. The first transceiver is fixedly disposed in the space. The communication device is movable in the space. The communication device includes a base, a second transceiver, a detection circuit, an arm and a processor. The second transceiver is oriented to an orientation and configured to build a signal transmission with the first transceiver. The detection circuit is configured to detect a displacement or rotation of the communication device with respect to the first transceiver, in order to generate detection information. One end of the arm is connected to the base, and another end of the arm is connected to the second transceiver. The processor is configured to control an operation of the arm according to the detection information, in order to maintain the orientation of second transceiver directing to the first transceiver.

18 Claims, 9 Drawing Sheets

(51) Int. Cl.
  *H01Q 1/08* (2006.01)
  *H01Q 1/27* (2006.01)
  *H01Q 5/22* (2015.01)
  *H01Q 1/18* (2006.01)
  *H01Q 3/08* (2006.01)
  *H04B 1/40* (2015.01)
  *G08C 23/04* (2006.01)
  *H01Q 1/00* (2006.01)

(52) U.S. Cl.
  CPC ........... *H01Q 1/084* (2013.01); *H01Q 1/1264* (2013.01); *H01Q 1/185* (2013.01); *H01Q 1/276* (2013.01); *H01Q 3/08* (2013.01); *H01Q 5/22* (2015.01); *G02B 2027/0138* (2013.01); *G02B 2027/0187* (2013.01)

(56) References Cited

U.S. PATENT DOCUMENTS

| | | | | |
|---|---|---|---|---|
| 3,889,190 | A * | 6/1975 | Palmer | A42B 3/30 455/90.3 |
| 4,051,534 | A * | 9/1977 | Dukich | G02B 27/017 348/211.4 |
| 4,607,395 | A * | 8/1986 | Sundahl | A42B 3/30 338/163 |
| 4,696,053 | A * | 9/1987 | Mastriani | H04B 7/005 342/359 |
| 5,142,700 | A * | 8/1992 | Reed | A42B 3/30 2/422 |
| 5,404,577 | A * | 4/1995 | Zuckerman | A42B 3/30 455/351 |
| 6,091,329 | A * | 7/2000 | Newman | H04B 1/40 340/539.15 |
| 6,456,261 | B1 * | 9/2002 | Zhang | G02B 27/017 345/7 |
| 6,934,633 | B1 * | 8/2005 | Gallagher | G01C 21/00 342/357.52 |
| 7,309,080 | B2 * | 12/2007 | Mein | B60R 11/04 212/348 |
| 9,007,217 | B1 * | 4/2015 | Anvari | H01Q 1/276 340/540 |
| 2008/0191950 | A1 * | 8/2008 | Chang | H01Q 1/276 343/718 |
| 2010/0060569 | A1 * | 3/2010 | Shamilian | G06F 1/1626 345/156 |
| 2014/0203147 | A1 * | 7/2014 | Barsheshet | B64D 39/04 244/135 A |

FOREIGN PATENT DOCUMENTS

| | | |
|---|---|---|
| CN | 205581842 U | 9/2016 |
| TW | M427577 U | 4/2012 |
| TW | M455953 U | 6/2013 |

* cited by examiner

COMMUNICATION SYSTEM AND COMMUNICATION METHOD

CROSS-REFERENCE TO RELATED APPLICATION

This application claims priority to U.S. Provisional Application Ser. No. 62/470,368, filed on Mar. 13, 2017, which is herein incorporated by reference.

BACKGROUND

Technical Field

Present disclosure relates to a wireless communication system and a wireless communication method. More particularly, the present disclosure relates to the communication system and the communication method for adapting changes of relative position between transceivers.

Description of Related Art

Virtual reality technology is very powerful in many approaches. Currently, signal transmissions in most of the virtual reality systems are established through physical cables. If tries to build signal transmissions through wireless communication systems, existing phased-array antenna can be helpful. However, sight of the phased-array antenna disposed on head-mounted display is still vulnerable to the blind spots shaded by the user's head.

SUMMARY

The disclosure relates to a communication system applied to a space. The communication system comprises a first transceiver and a communication device. The first transceiver is fixedly disposed in the space. The communication device is movable in the space. The communication device comprises a base, a second transceiver, a detection circuit, an arm and a processor. The second transceiver is oriented to an orientation. The second transceiver is configured to build a signal transmission with the first transceiver. The detection circuit is configured to detect a displacement or a rotation of the communication device with respect to the first transceiver, in order to generate detection information. The arm is disposed on the base to carry the second transceiver. The arm is operative over the base. The processor is electrically coupled to the arm. The processor is configured to control an operation of the arm according to the detection information, in order to maintain the orientation of second transceiver directing to the first transceiver.

An aspect of the disclosure is related to a communication method employed in a space. A first transceiver is fixedly disposed in the space. The communication method comprises following steps: building, by a second transceiver of a communication device, a signal transmission with the first transceiver; detecting, by a detection circuit of the communication device, a displacement of the communication device or rotation of the communication device with respect to the first transceiver in order to generate detection information; and controlling, by a processor of the communication device, an operation of an arm of the communication device according to the detection information, in order to maintain an orientation of second transceiver directing to the first transceiver.

It is to be understood that both the foregoing general description and the following detailed description are by examples, and are intended to provide further explanation of the disclosure as claimed.

BRIEF DESCRIPTION OF THE DRAWINGS

Present disclosure can be more fully understood by reading the following detailed description of the embodiments, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

The terminology used herein is for the purpose of describing particular embodiments only and is not intended to be limiting of the disclosure. As used herein, the singular forms "a," "an," and "the" are intended to include the plural forms as well, unless the context clearly indicates otherwise.

It will be understood that, although the terms "first," "second," etc., may be used herein to describe various elements, these elements should not be limited by these terms. These terms are used to distinguish one element from another.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

As used herein, the terms "comprising," "including," "having," and the like are to be understood to be open-ended, i.e., to mean including but not limited to.

As used herein, the term "and/or" includes any and all combinations of one or more of the associated listed items.

As used herein, the direction of terms, such as "Up," "Down," "Left," "Right," "top," "bottom," etc, are understood to be a reference direction of the attached drawings. Therefore, the direction of terms used herein are to describe and understand the present disclosure, and not to limit the present disclosure.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Figure 1:
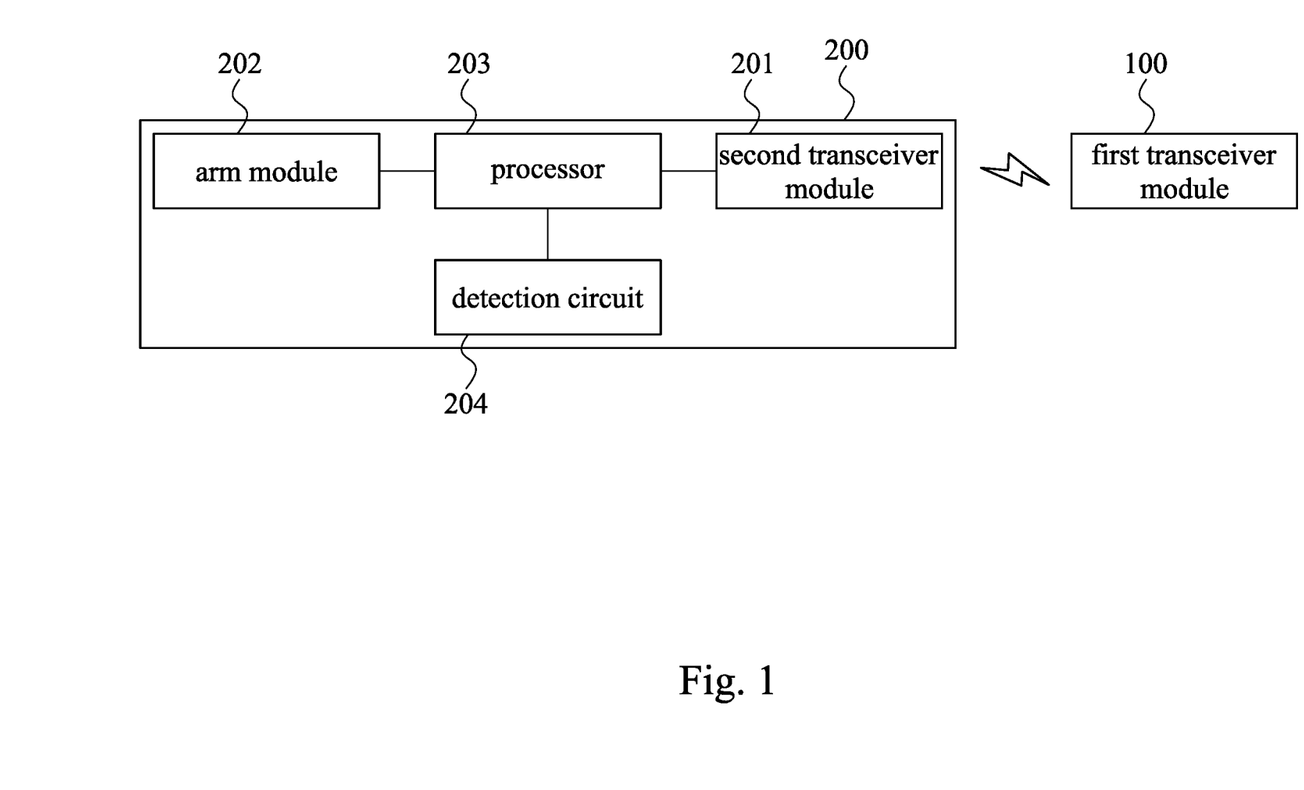
FIG. 1 is a schematic diagram of a communication system according to an embodiment of present disclosure.

FIG. 1 is a schematic diagram of a communication system according to an embodiment of present disclosure. As shown in FIG. 1, in the embodiment, the communication system includes a first transceiver module 100 and a communication device 200. The first transceiver module 100 and the communication device 200 are both disposed in a space. The space may be, but not limited to, a room, chamber or exhibition hall, etc. In some embodiments, the first transceiver module 100 is fixedly disposed at a position in the space. For instance, if the space is a room, the first transceiver module 100 may be attached to the walls or ceiling of the room. Alternatively, the first transceiver module 100 may be mounted on a support fixed at a position in the space. Different from the first transceiver module 100, the communication device 200, in operation, is movable in the space. In the embodiment, the communication device 200 may be a head-mounted display. The communication device 200 may be mounted on a user's head. In this case, when the user moves in the space or the user rotates his/her head, the communication device 200 being carried moves or rotates accordingly.

As shown in FIG. 1, in the embodiment, the communication device 200 includes a second transceiver module 201, an arm module 202, a processor 203 and a detection circuit 204. The processor 203 is electrically coupled to the second transceiver module 201, the arm module 202 and the detection circuit 204. As mentioned, in the embodiment, the communication device 200 is the head-mounted display, and the second transceiver module 201 is used to transmit signals with the first transceiver module 100.

Figure 2:
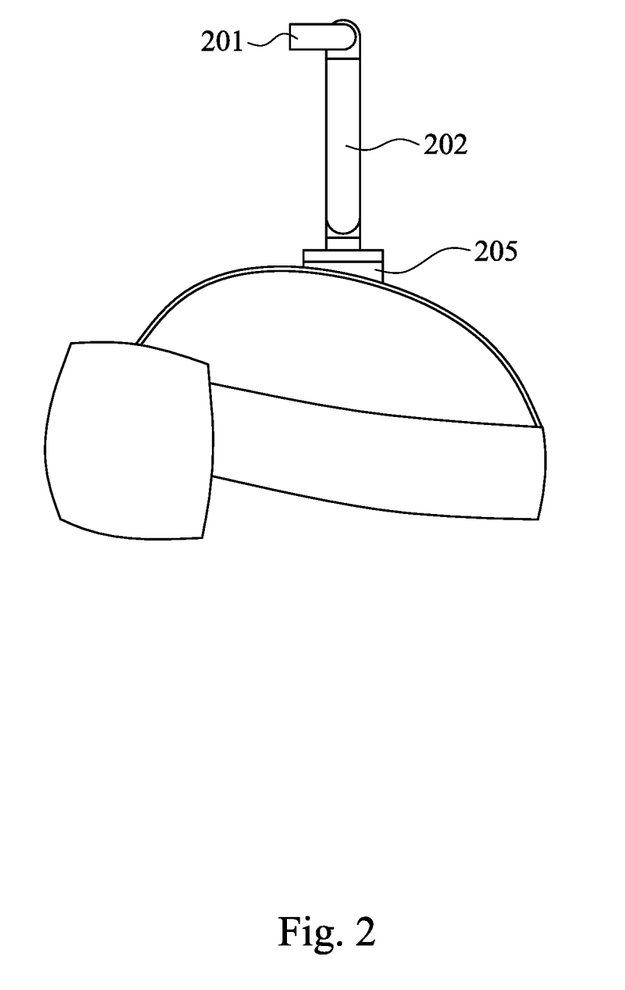
FIG. 2 is a schematic diagram of a communication device according to an embodiment of present disclosure.

For better understandings, reference can be made to FIG. 2 of present disclosure. FIG. 2 is a schematic diagram of a communication device according to an embodiment of present disclosure. In the embodiment, the appearance of the communication device 200 is shown. As shown in FIG. 2, the communication device 200 is mounted with a base 205. One end of the arm module 202 is pivotably connected to the base 205. Another end of the arm module 202 is pivotably connected to the second transceiver module 201. Thus, the arm module 202 is operative to perform rotational motion or translational displacement over the base 205. When the arm module 202 performs such actions, the second transceiver module 201 carried by the arm module 202 can be oriented to an orientation. It is to say, the arm module 202 is employed to control the orientation of the second transceiver module 201. In the embodiment, when the communication device 200 is moved in the space, the arm module 202 is used to hold the second transceiver module 201 oriented to the first transceiver module 100, so that the stability of the signal transmission between the second transceiver module 201 and the first transceiver module 100 is ensured.

Figure 3:
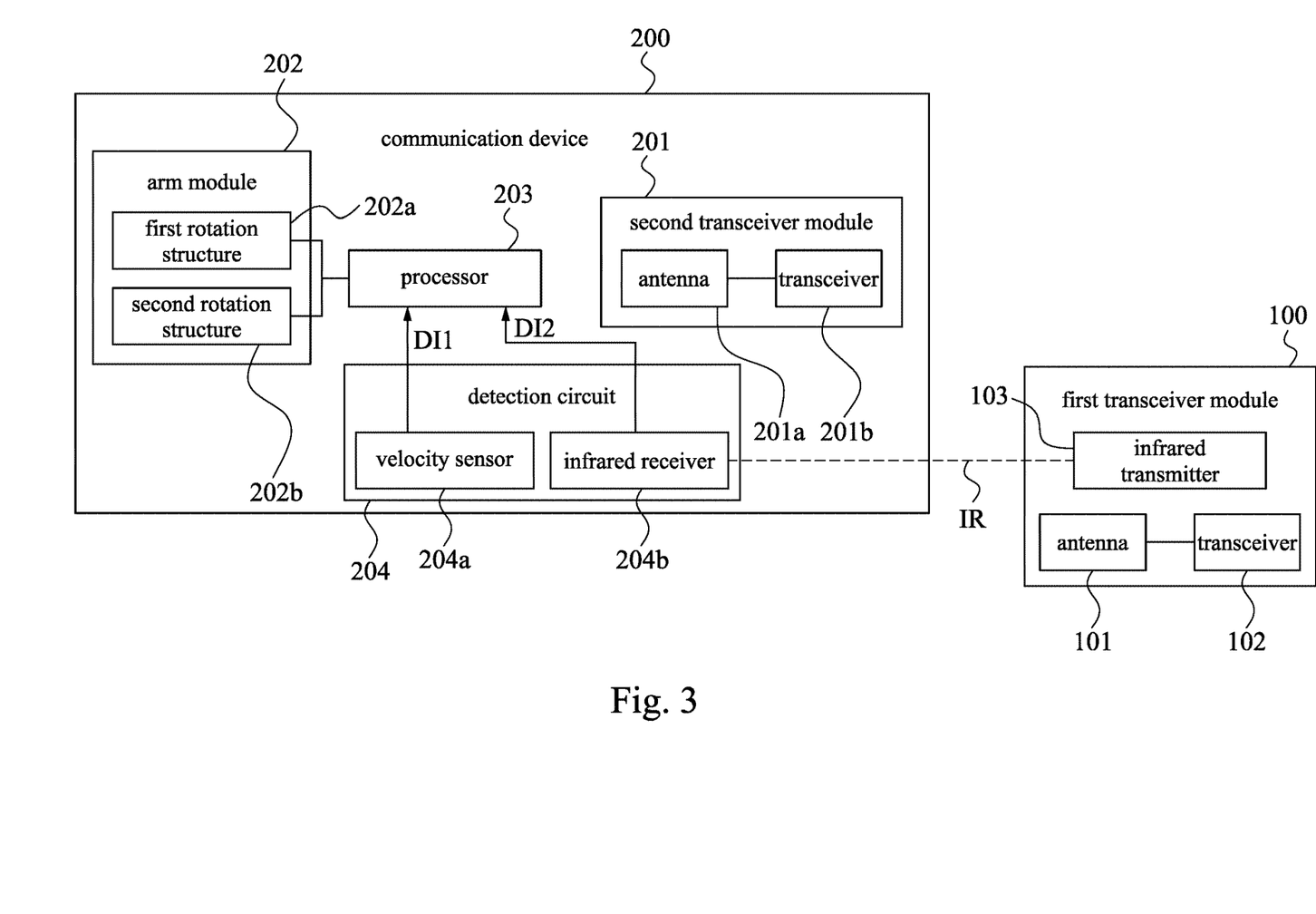
FIG. 3 is a schematic diagram of a communication system according to an embodiment of present disclosure.

FIG. 3 is a schematic diagram of a communication system according to an embodiment of present disclosure. As shown in FIG. 3, in the embodiment, the components of the communication system of FIG. 1 are illustrated in detail. As shown in FIG. 3, in the embodiment, the first transceiver module 100 includes an antenna 101, a transceiver 102 and an infrared transmitter 103. The antenna 101, for example, may be a millimeter-wave frequency antenna having a first orientation. Since the first transceiver module 100 is fixedly disposed at a specific position in the space, the first orientation of the first transceiver module 100 is fixed. In the embodiment, the transceiver 102 is electrically coupled to the antenna 101. The transceiver 102 may transmit or receive radio frequency signal via the antenna 101. The infrared transmitter 103 is configured to send infrared signal IR toward the space.

As shown in FIG. 3, in the embodiment, the second transceiver module 201 includes an antenna 201a and a transceiver 201b. The antenna 201a, for example, may be a millimeter-wave frequency antenna having a second orientation. The transceiver 201b is electrically coupled to the antenna 201a. The transceiver 201b may transmit or receive radio frequency signal via the antenna 201a. Moreover, as shown in FIG. 3, in the embodiment, the detection circuit 204 includes a speed sensor 204a and an infrared receiver 204b. The speed sensor 204a is configured to detect an acceleration of the communication device 200 or an angular acceleration of the communication device 200, in order to generate first detection information DI1. The infrared receiver 204b is configured to receive infrared signal IR sent by the infrared transmitter 103 to generate second detection information DI2. As described in following paragraphs, in some embodiments, the processor 203 may control the operation of the arm module 202 and the second transceiver module 201 according to the first detection information DI1 and/or the second detection information DI2. Thus, the signal transmission between the communication device 200 and the first transceiver module 100 may be ensured.

As shown in FIG. 3, in the embodiment, the arm module 202 includes a first rotation structure 202a, a second rotation structure 202b and an arm body 202c. In some embodiments, a length of the arm module 202 is substantially equal to a radius of the communication device 200 (the head-mounted display). In this case, no matter how the user's head rotates or moves, the operation of the arm module 202 may keep a sight of the second transceiver module 201 being not shaded by the communication device 200.

Figure 4:
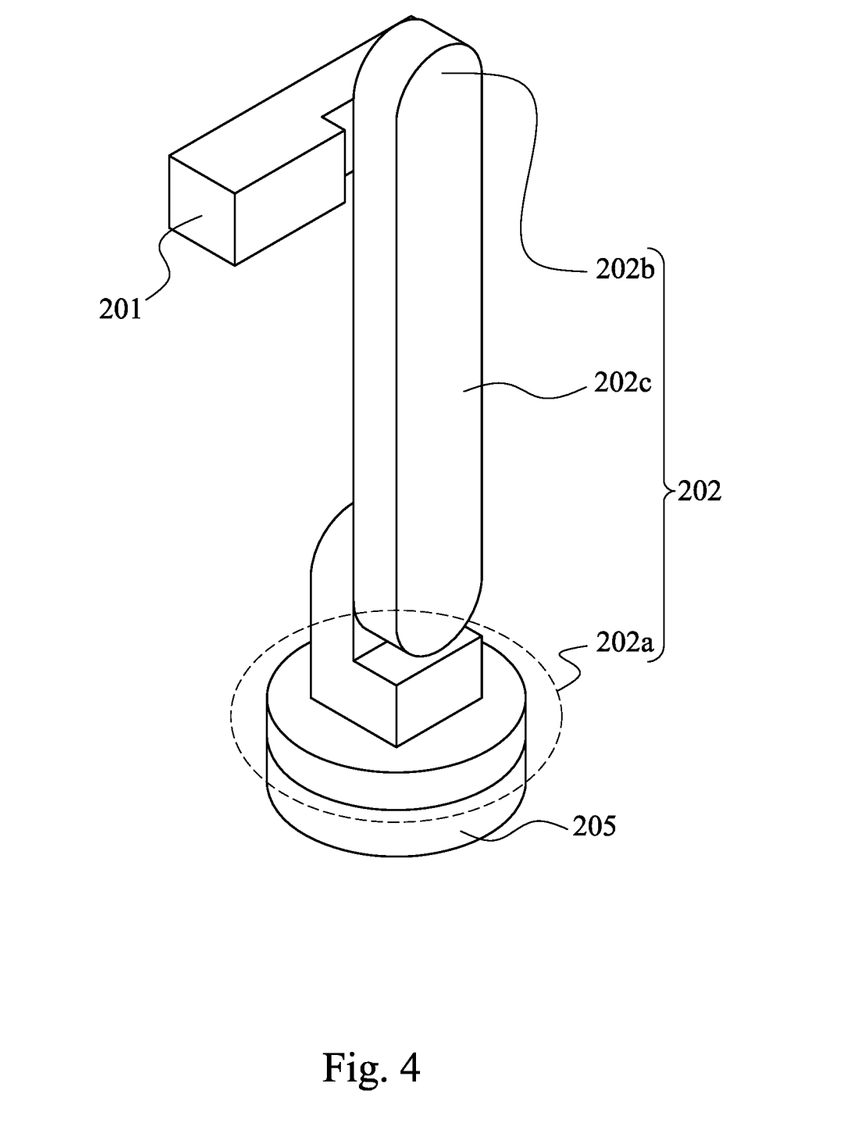
FIG. 4 is a schematic diagram of a communication device in part according to an embodiment of present disclosure.

For better understandings, reference can be made to FIG. 4 of present disclosure. FIG. 4 is a schematic diagram of a communication device in part according to an embodiment of present disclosure. As shown in FIG. 4, the first rotation structure 202a is pivotably connected the arm body 202c with the base 205. The first rotation structure 202a provides an mechanism allowing the arm body 202c to be rotated around the base 205 along at least four directions (vertically and horizontally). Similarly, the second rotation structure 202b is pivotably connected the arm body 202c with the second transceiver module 201. The second rotation structure 202b provides the second transceiver module 201 to be rotated around the arm body 202c along at least two directions (vertically). The operations of the first rotation structure 202a and the second rotation structure 202b allow the arm body 202c to be rotated or swung around the base 205. Thus, the second orientation of the antenna 201a can be controlled. It is noted that the configuration of FIG. 4 is given for illustrative purposes, and the present disclosure is not limited thereto. In some embodiments, the second rotation structure 202b provides the second transceiver module 201 to be rotated around the arm body 202c along at least four directions (vertically and horizontally). In this case, more available operations of the arm body 202c rotated over the base 205 may be provided.

The first rotation structure 202a and the second rotation structure 202b may be implemented with several connecting components. For example, each of the first rotation structure 202a and the second rotation structure 202b includes a connecting shaft and a rotation joint (not shown in figure) disposed on the arm body, and the connecting shaft and the rotation joint are connected to perform said operations. The above implementations are given for illustrative purposes, and various implementations of the first rotation structure 202a or the second rotation structure 202b are within the contemplated scope of the present disclosure.

As shown in FIG. 1 and FIG. 3, in the embodiment, the second transceiver module 201, the arm module 202 and the detection circuit 204 of the communication device 200 are all electrically coupled to the processor 203. For example, the processor 203 may be a single processor or an integration of multiple microprocessors. The processor 203 may be connected to internal memories or external memories (not shown in figure) via buses. The internal memories or external memories may be volatile or non-volatile memories. The processor 203 is configured to retrieve a plurality of instructions from the internal memories or external memories, and to execute these instructions for certain predetermined processes. It is noted that the predetermined processes may be described in following paragraphs.

Figure 5:
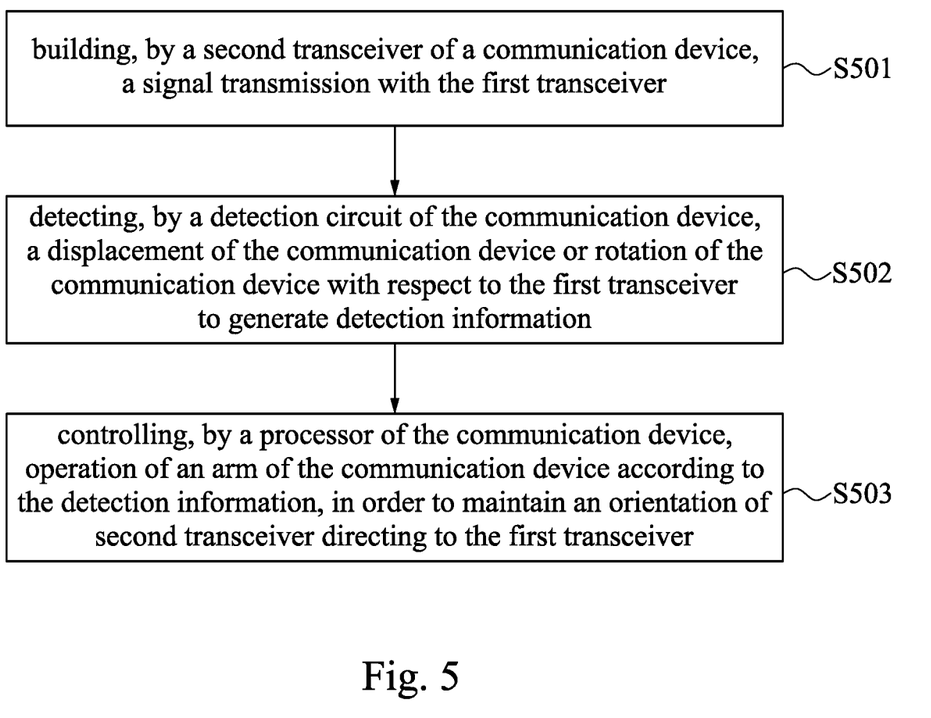
FIG. 5 is a flow chart of a communication method according to an embodiment of present disclosure.

FIG. 5 is a flow chart of a communication method according to an embodiment of present disclosure. In the embodiment, an association of the communication device 200 and the first transceiver module 100 establishes such communication method. For better understandings, references are now made to the embodiments of FIG. 1-4. In the embodiment, the steps of the communication method are described in details.

Step S501: building, by the second transceiver module 201 of the communication device 200, the signal transmission with the first transceiver module 100. As shown in FIG. 1-4, in the embodiment, the first transceiver module 100 is fixedly disposed in the space but the communication device 200 is movable in the space. As mentioned, the transceiver 102 of the first transceiver module 100 may transmit radio frequency signals toward the first orientation via the antenna 101, or receive radio frequency signals therefrom. Similarly, the second transceiver module 201 of the communication device 200 includes the antenna 201a and the transceiver 201b. The transceiver 201b may transmit radio frequency signals toward the second orientation via the antenna 201a, or receive radio frequency signals therefrom.

In some embodiments, when the first orientation of the antenna 101 is substantially aligned to the second orientation of antenna 201a (as the line of sight described below), the transmission efficiency between the second transceiver module 201 of the communication device 200 and the first transceiver module 100 may be increased.

Step S502: detecting, by the detection circuit 204 of the communication device 200, a displacement of the communication device 200 or rotation of the communication device 200 with respect to the first transceiver module 100 to generate detection information. The detection information may be provided as coordinates or relative positions in the space. For instance, when the communication device 200 is moved or rotated in the space, the speed sensor 204a may detect an acceleration of the communication device 200 or angular acceleration of the communication device 200 for the generation of the first detection information DI1. The infrared receiver 204b may receive the infrared signal IR sent from the infrared transmitter 103 for the generation of the second detection information DI2.

More specifically, in one embodiment, the speed sensor 204a at least includes an accelerometer and a gyroscope (not shown). The accelerometer is configured to measure the acceleration of the communication device 200 with respect to an initial point of the space. The speed sensor 204a may obtain the displacement of the communication device 200 in the space according to the acceleration. The gyroscope is configured to measure the angular acceleration of the communication device 200 with respect to an initial point of the space. The speed sensor 204a may obtain the angular displacement of the communication device 200 in the space according to the acceleration. The speed sensor 204a may generate the first detection information DI1 based on the displacement and the angular displacement of the communication device 200.

More specifically, in an embodiment, the infrared transmitter 103 may transmit plurality of infrared signal IR, in several cycles, to scan the space. When the infrared receiver 204b receives the infrared signals IR, the time that the infrared signal IR is received may be processed for a determination of a relative distance or relative angle between the infrared receiver 204b and the second transceiver module 201. As mentioned, the infrared receiver 204b may generate the second detection information DI2 according to the relative distance or the relative angle. Based on the second detection information DI2, the processor 203 may determine whether to adapt the second transceiver module 201 to the first transceiver module 100 by moving the arm module 202.

It is noted that the embodiment shown in FIG. 3 is not intend to limit the scope of present disclosure. In some embodiments, the infrared receiver 204b of the communication device 200 may be replaced by an optical capturing device. Correspondingly, the infrared transmitter 103 of the first transceiver module 100 may be replaced by an optical reference point. In this case, the optical capturing device is configured to track a position of the optical reference point on the first transceiver module 100 in order to generate the second detection information DI2. As mentioned, the first detection information DI1 and the second detection information DI2 include information indicating the displacement or rotation of the communication device 200 with respect to the first transceiver module 100. The first detection information DI1 and the second detection information DI2 are then sent to the processor 203.

Step S503: controlling, by the processor 203 of the communication device 200, operation of the arm module 202 of the communication device 200 according to the detection information, in order to maintain an orientation of second transceiver module 201 directing to the first transceiver module 100.

As shown in FIG. 1-4, in the embodiment, as long as the communication device 200 is in operation, the processor 203 of the communication device 200 may control the first rotation structure 202a and the second rotation structure 202b to rotate or swing the arm module 202. As a result, the second orientation of the second transceiver module 201 may be substantially aligned to the first orientation of the first transceiver module 100, it forms a line of sight from the second transceiver module 201 to the first transceiver module 100. By maintaining the line of sight, the signal transmission efficiency of the second transceiver module 201 and the first transceiver module 100 may be improved.

As mentioned, once the signal transmission between the second transceiver module 201 and the first transceiver module 100 is built successfully, a signal strength (RSSI) indicating the transmission quality may be measured by the second transceiver module 201. The processor 203 may rotate or swing the arm module 202 in a continuous manner, and record the signal strengths measured by the second transceiver module 201 (e.g. recorded in said memories). Based on the signal strengths, the processor 203 may control the arm module 202 to maintain current signal strength of the signal transmission over (or equal to) a strength threshold. For example, in some embodiments, the strength threshold is determined according to maximum signal strength among these signal strengths, such as the maximum signal strength of itself or signal strength slightly lower than the maximum. In this case, the processor 203 may control the arm module 202 to maintain current signal strength of the second transceiver module 201 approaching the maximum signal strength.

In the embodiment, the processor 203 may receive the first detection information DI1 and the second detection information DI2 obtained by the detection circuit 204, and control the operation of the arm module 202 according to the first detection information DI1 and the second detection information DI2. As a result, the first orientation and the second orientation may still be aligned when the user is moving, and the signal strength of the signal transmission may be maintained.

More specifically, in some embodiments, the first detection information DI1 carry information indicating the acceleration of the communication device 200 or the angular acceleration of the communication device 200 when the communication device 200 is moved or rotated. Accordingly, the processor 203 may drive the arm module 202 according to the acceleration or the angular acceleration, in order to maintain the arm module 202 as perpendicular to a ground of the space. Under this condition, the second transceiver module 201, mounted on the arm module 202, may have a decent angle for transmit and/or receive signals, and the arm module 202 may have more space for rotating or swinging in following cycles. In addition, the processor 203 may calculate a relative distance or relative position between communication device 200 and the first transceiver module 100 according to the first detection information DI1 and/or the second detection information DI2. The operation of the arm module 202 is determined according to side relative distance or relative position. As such, the second orientation of the second transceiver module 201 is held to be oriented to the first transceiver module 100, and the line of sight from the second transceiver module 201 to the first transceiver module 100 may be maintained.

In the embodiment, when the user's head rotates or moves along vertical axis, the first detection information DI1 carry information indicating the angle acceleration about the rotation of the communication device 200, the processor 203 may control the operation of the arm module 202 according to the first detection information DI1. The arm module 202 is controlled to rotate toward a direction opposite to the angle acceleration on the base 205. Therefore, the second orientation of the second transceiver module 201 is kept being oriented to the first transceiver module 100.

Figure 6A:
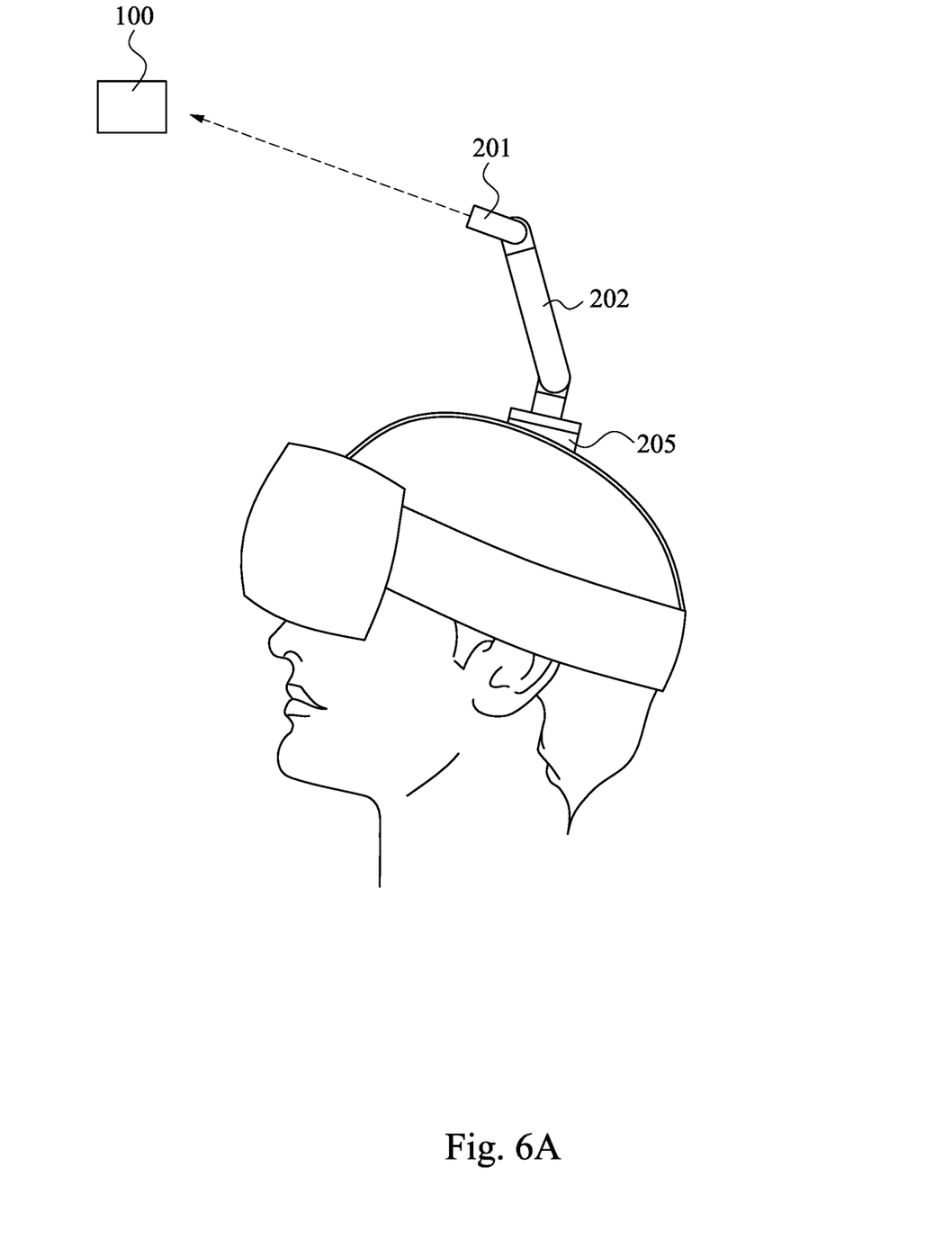
FIG. 6A is a schematic diagram of a communication device according to an embodiment of present disclosure.
Figure 6B:
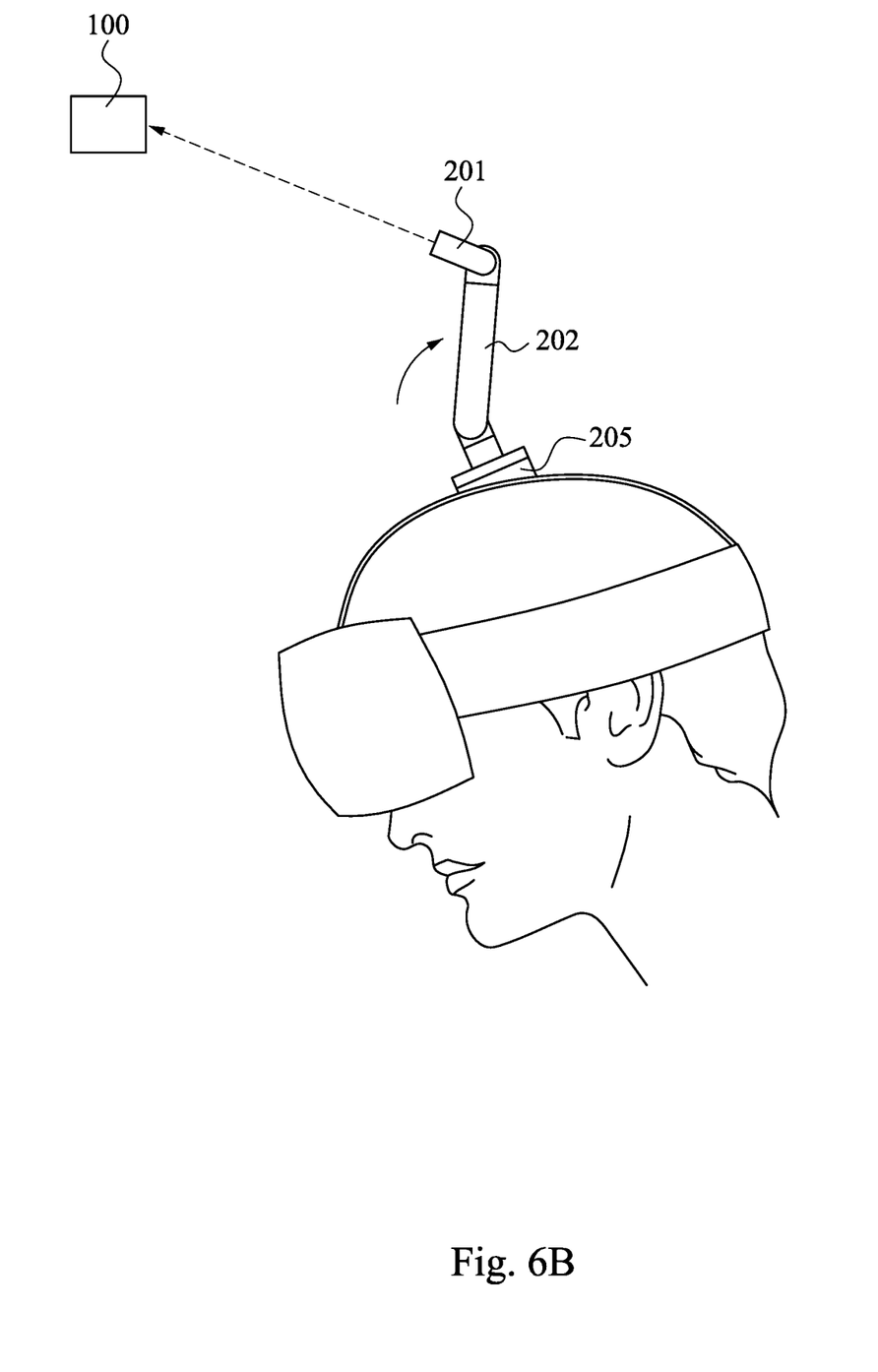
FIG. 6B is a schematic diagram of a communication device according to an embodiment of present disclosure.

For better understandings, references are now made to FIG. 6A and FIG. 6B. FIG. 6A and FIG. 6B are both schematic diagrams of a communication device according to an embodiment of present disclosure. As shown in the lateral views of FIG. 6A, when a downward rotation is reflected on the user's head (e.g. when the user heads down), the first detection information DI1 carry information indicating the angular acceleration indicating the downward rotation. In this case, the processor 203 may control the arm module 202 to rotate, oppositely, against the angular acceleration, so that the line of sight from the second transceiver module 201 to the first transceiver module 100 may be maintained. As shown in the lateral views of FIG. 6B, when an upward rotation is reflected on the user's head (e.g. when the user heads up), the first detection information DI1 carry information indicating the angular acceleration that indicates the upward rotation. In this case, the processor 203 may control the arm module 202 to rotate, oppositely, against the angular acceleration, so that the line of sight from the second transceiver module 201 to the first transceiver module 100 may be maintained.

In the same manner, in the embodiment, when communication device 200 carried by the user is moved horizontally, the processor 203 may drive the arm module 202 correspondingly in order to keep the second orientation of the second transceiver module 201 directing to the first transceiver module 100.

Figure 7A:
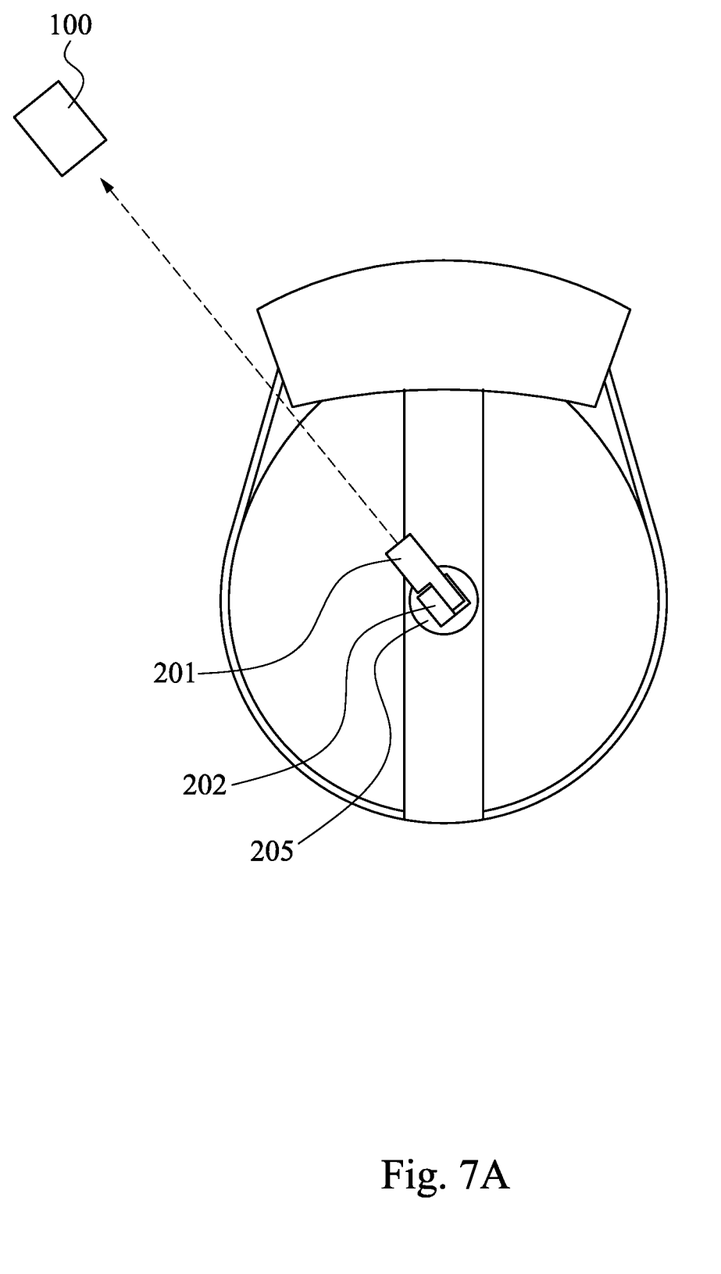
FIG. 7A is a schematic diagram of a communication device according to an embodiment of present disclosure.
Figure 7B:
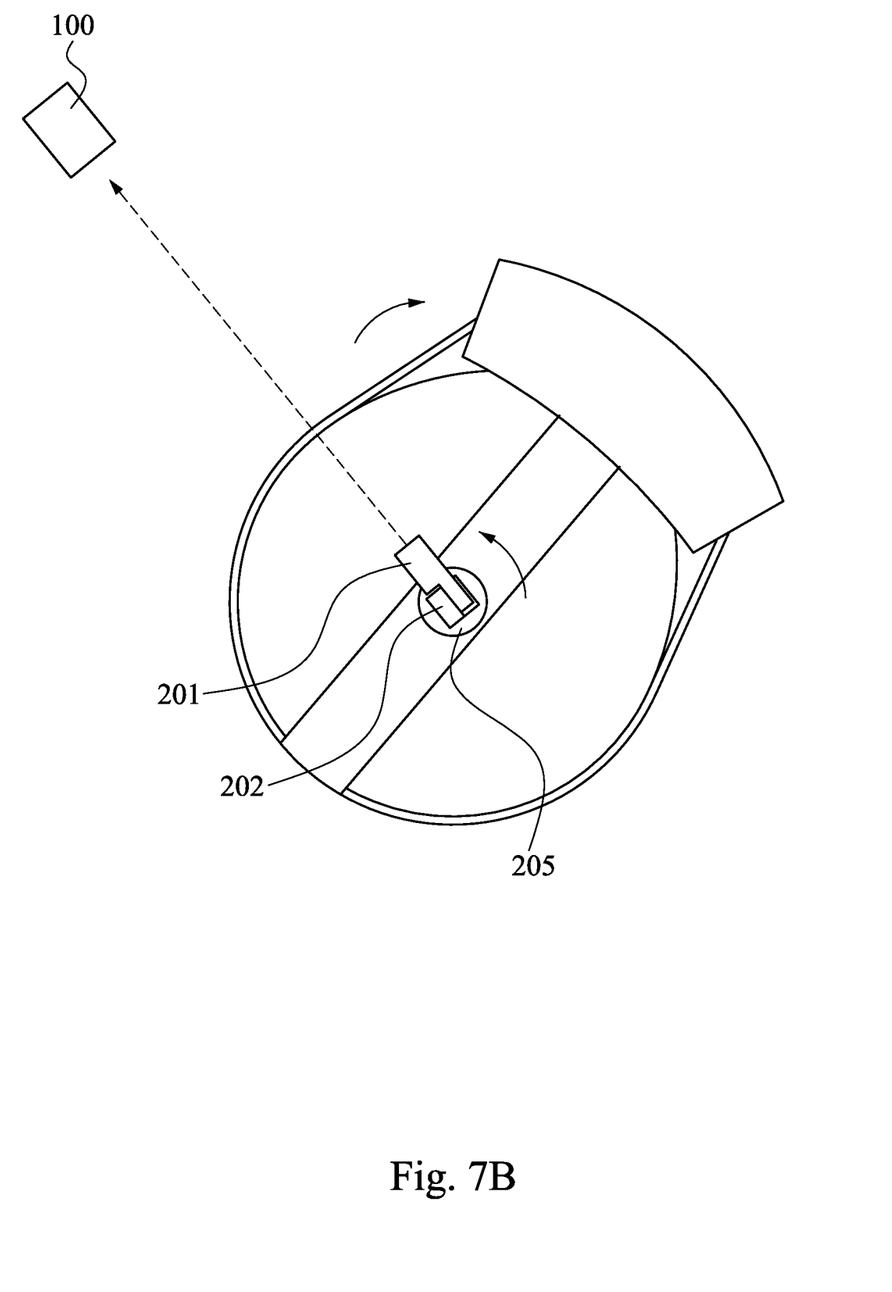
FIG. 7B is a schematic diagram of a communication device according to an embodiment of present disclosure.

For better understandings, references are now made to FIG. 7A and FIG. 7B. FIG. 7A and FIG. 7B are both schematic diagrams of a communication device according to an embodiment of present disclosure. As shown in the above views of FIG. 7A and FIG. 7B, when a clockwise rotation is reflected on the user's head, the first detection information DI1 carry information indicating the angular acceleration indicating the clockwise rotation. In this case, the processor 203 may control the arm module 202 to rotate, oppositely, against the angular acceleration, so that the line of sight from the second transceiver module 201 to the first transceiver module 100 may be maintained.

In foregoing embodiments, the processor 203 of the communication device 200 may operates the arm module 202 according to above processes. Thus, the signal strength of the second transceiver module 201 may be kept being as the maximum signal strength, approximately. It prevents the disconnection between the second transceiver module 201 and the first transceiver module 100. The stability of signal transmission is therefore improved.

As mentioned, in the application, the communication device 200 may be the head-mounted display. On the other hand, the first transceiver module 100 fixed in space may be communicatively coupled to a host computer. Therefore, present disclosure provides an improved connection approach between the head-mounted display and the host computer. The physical connection limitation between the communication device 200 and the host computer is removed. When the user is immersed in the virtual reality environment provided by the host computer, the first transceiver module 100 sends out radio frequency signals with information carried, and the second transceiver module 201 of the communication device 200 receives such radio frequency signals. Thus, wireless communication connecting the communication device 200 with the host computer is established. The user experience is therefore improved for the enlarged range of activity brought by the wireless communication.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A communication system, applied to a space, the communication system comprising:
   a first transceiver fixedly disposed in the space; and
   a communication device disposed in the space, wherein the communication device is movable in the space, and the communication device comprises:

a base;
a second transceiver oriented to an orientation, the second transceiver configured to build a signal transmission with the first transceiver;
a detection circuit, configured to detect a displacement or a rotation of the communication device with respect to the first transceiver, in order to generate detection information;
an arm disposed on the base to carry the second transceiver, the arm is operative over the base; and
a processor electrically coupled to the arm, the processor configured to control an operation of the arm according to the detection information, in order to maintain the orientation of second transceiver directing to the first transceiver.

2. The communication system of claim 1, wherein the processor is configured to control the operation of the arm to maintain a signal strength of the signal transmission being higher than a strength threshold.

3. The communication system of claim 1, the communication device further comprises:
a first rotation structure pivotably connected between the arm and the base; and
a second rotation structure pivotably connected between the arm and the second transceiver,
wherein when the communication device is moved in the space, the processor is configured to control the operation of the arm with the first rotation structure and the second rotation structure to control the operation of the arm.

4. The communication system of claim 1, wherein the detection circuit further comprises:
a speed sensor electrically coupled to the processor, wherein when the communication device is moved in the space, the speed sensor is configured to detect an acceleration of the communication device or an angular acceleration of the communication device, in order to generate the detection information.

5. The communication system of claim 4, wherein the processor controls the operation of the arm according to the detection information, in order to maintain a coaxial of the arm substantially perpendicular to a ground of the space.

6. The communication system of claim 4, wherein the processor controls the operation of the arm according to the detection information to rotate the arm to a direction opposite to the angular acceleration of the communication device.

7. The communication system of claim 1, wherein the detection circuit further comprises:
an infrared receiver electrically coupled to the processor, wherein when the communication device is moved in the space, the infrared receiver tracks an infrared signal transmitting from an infrared transmitter of the first transceiver, in order to generate the detection information.

8. The communication system of claim 1, wherein the detection circuit further comprises:
an optical capturing device electrically coupled to the processor, wherein when the communication device is moved in the space, the optical capturing device tracks a position of an optical reference disposed on the first transceiver to generate the detection information.

9. The communication system of claim 1, wherein the base is disposed on a top surface of a head-mounted display.

10. The communication system of claim 9, wherein a length of the arm is substantially equal to a radius of the head-mounted display.

11. A communication method, applied to a space in which a first transceiver is fixedly disposed, the communication method comprises:
building, by a second transceiver of a communication device, a signal transmission with the first transceiver;
detecting, by a detection circuit of the communication device, a displacement of the communication device or rotation of the communication device with respect to the first transceiver in order to generate detection information; and
controlling, by a processor of the communication device, an operation of an arm of the communication device according to the detection information, in order to maintain an orientation of second transceiver directing to the first transceiver.

12. The communication method of claim 11, wherein the processor is configured to control the operation of the arm to maintain a signal strength of the signal transmission being higher than a strength threshold.

13. The communication method of claim 11, further comprising:
when the communication device is moved in the space, detecting, by a speed sensor of the detection circuit, an acceleration of the communication device or an angular acceleration of the communication device, in order to generate the detection information.

14. The communication method of claim 13, wherein the processor controls the operation of the arm according to the detection information, in order to maintain a coaxial of the arm substantially perpendicular to a ground of the space.

15. The communication method of claim 13, wherein the processor controls the operation of the arm according to the detection information to rotate the arm to a direction opposite to the angular acceleration of the communication device.

16. The communication method of claim 11, further comprising:
when the communication device is moved in the space, tracking, by an infrared receiver of the detection circuit, an infrared signal transmitting from an infrared transmitter of the first transceiver, in order to generate the detection information.

17. The communication method of claim 11, further comprising:
when the communication device is moved in the space, tracking, by an optical capturing device of the detection circuit, a position of an optical reference disposed on the first transceiver, in order to generate the detection information.

18. The communication method of claim 11, wherein the communication device is a head-mounted display.

* * * * *